(12) United States Patent
Neuneier et al.

(10) Patent No.: US 6,317,730 B1
(45) Date of Patent: Nov. 13, 2001

(54) METHOD FOR OPTIMIZING A SET OF FUZZY RULES USING A COMPUTER

(75) Inventors: Ralf Neuneier, München; Hans-Georg Zimmermann, Starnberg/Percha; Stefan Siekmann, Hermannsburg, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/194,263

(22) PCT Filed: May 14, 1997

(86) PCT No.: PCT/DE97/00967

§ 371 Date: Nov. 23, 1998

§ 102(e) Date: Nov. 23, 1998

(87) PCT Pub. No.: WO97/44743

PCT Pub. Date: Nov. 27, 1997

(30) Foreign Application Priority Data

May 23, 1996 (DE) .............................. 196 20 841

(51) Int. Cl.[7] .................................. G06F 15/18
(52) U.S. Cl. .............................................. 706/2
(58) Field of Search .................................. 706/2

(56) References Cited

U.S. PATENT DOCUMENTS 5,714,866 * 2/1998 S et al. ..................................... 320/5
5,751,915 * 5/1998 Werbos ................................. 706/4

FOREIGN PATENT DOCUMENTS

WO 93/21598 10/1993 (WO) .

OTHER PUBLICATIONS

Backory et al, "A Robust Growing–Pruning Algorithm Using Fuzzy Logic", IEEE Proceedings of ICNN, Nov.–Dec. 1995.*
Casalino et al, "Semantic Phase Transition in a Classifier Based on an Adaptive Fuzzy System", IEEE Proceedings of the 3rd IEEE Conference on Fuzzy Systems, Jun. 1994.*
Sulzberger et al, "FUN: Optimization of Fuzzy Rule Based Systems Using Neural Networks", IEEE ICNN, Mar.–Apr. 1993.*
Mitra et al, "Fuzzy Multi–Layer Perceptron, Inferencing and Rule Generation", IEEE Tranactions on Neural Networks, Jan. 1995.*
Khan et al, "Neufuz: Neural Network Fuzzy Logic Design Algorithms", IEEE International Conference on Fuzzy Systems, Mar.–Apr. 1993.*
Okada et al, "Initializing Multilayer Neural Networks with Fuzzy Logic", IEEE IJCNN, Jun. 1992.*
Berenji, H. R., "Neural Networks for Fuzzy Logic Inference", IEEE International Conference on Fuzzy Systems, Mar.–Apr. 1993.*
Proceedings of ICNN (1995)—International Conference on Neural Networks, vol. 1, XP002039980, Junhoug Nie et al, A Rule–Based Channel Equalizer with Learning Capability, pp. 606–611.

(List continued on next page.)

Primary Examiner—George B. Davis
(74) Attorney, Agent, or Firm—Schiff Hardin & Waite

(57) ABSTRACT

A set of fuzzy rules (FR) is mapped onto a neural network (NN) (501). The neural network (NN) is trained (502), and weights ($w_r$) and/or neurons (NE) of the neural network (NN) are pruned or grown (503). A new neural network (NNN) formed in this way is mapped onto a new fuzzy rule set (NFR) (504).

8 Claims, 3 Drawing Sheets

OTHER PUBLICATIONS

Fuzzy Sets and Systems, vol. 71, No. 3, (1995), J.J. Shann et al, "A fuzzy neural network for rule acquiring on fuzzy control systems", pp. 345–357.

Proceedings of IEEE $2^{nd}$ International Fuzzy Systems Conference, vol. 2, (1993), H.R. Berenji et al, Clustering in Product Space for Fuzzy Inference, pp. 1402–1407.

International Conference on Neural Networks/World Congress on Computational Intelligence, vol. 3, (1994), E. Tazaki et al, A Generation Method for Fuzzy Rules using Neural Networks with Planar Lattice Architecture, pp. 1743–1748.

Spektrum der Wissenschaft, Jun. 1995, Von Rudolf Kruse et al, Neuronal Fuzzy–Systeme, pp. 34–41.

Addison–Wesley Publishing Company, The Advanced Book Program, Lecture Notes vol. 1, John Hertz, Introduction to the Theory of Neural Computation, pp. 89–101.

Clarendon Press (1995), Christopher M. Bishop, Neural Networks for Pattern Recognition, pp. 353–364.

Proceedings of the ICANN—Workshop, (1995), R. Neuneier et al, A Semantic–Preserving Learning Algorithm for Neuro–Fuzzy Systems with Applications to Time Series Prediction, pp. 1–5.

Neural Networks, vol. 6, Original Contribution, William Finnoff et al, Improving Model Selection by Nonconvergent Methods, pp. 771–783.

Automatisierungstechnische Praxis 37 (1995), Hartmut Hensel et al, Optimierung von Fuzzy–Control mit Hilfe Neuronaler Netze, pp. 40–48.

Connection Science, vol. 7, No. 1, (1995), G.A. Carpenter et al, Rule Extraction: From Neural Architecture to Symbolic Representation, pp. 3–27.

Dissertation Institut für Informatik, Technische Universität München, (1993), J. Hollatz, Integration von regelbasiertem Wissen in neuronale Netze, pp. 35–58.

* cited by examiner

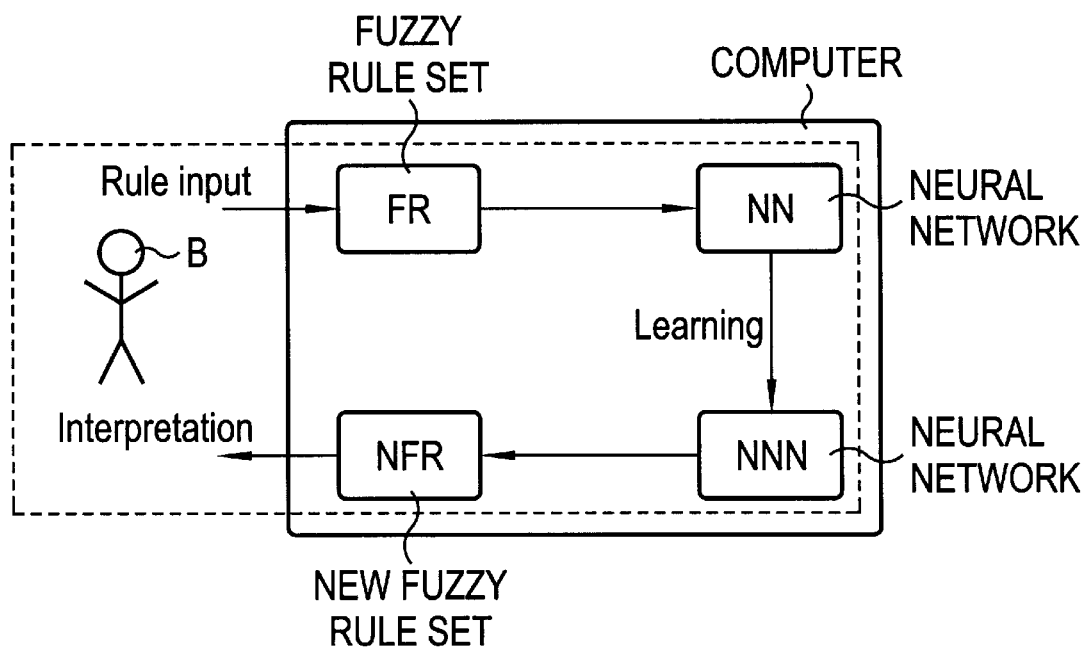
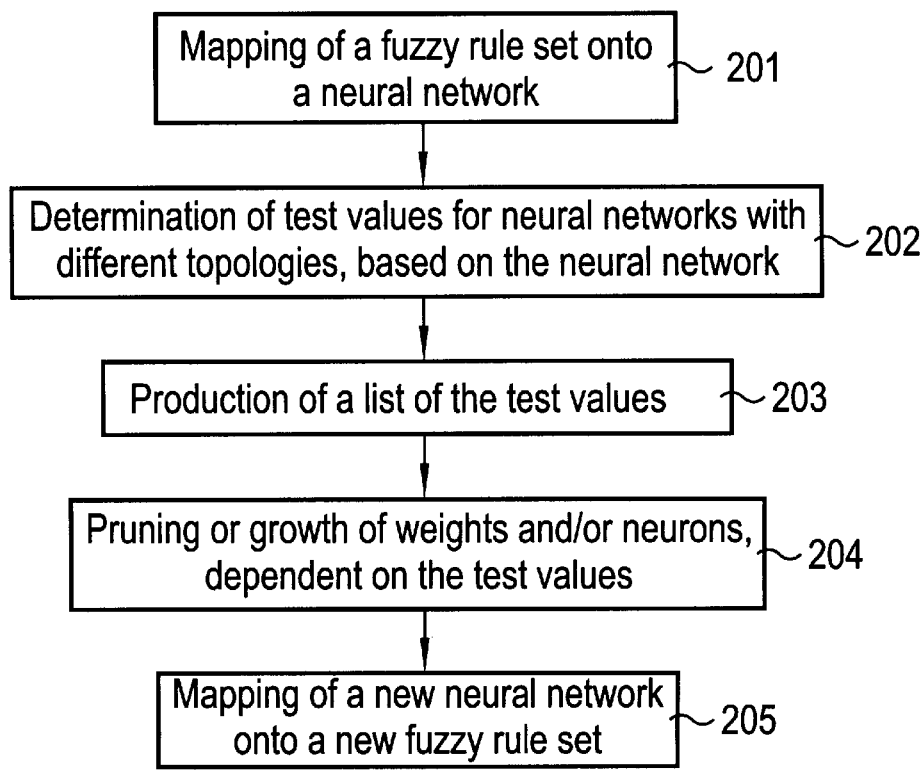

METHOD FOR OPTIMIZING A SET OF FUZZY RULES USING A COMPUTER

BACKGROUND OF THE INVENTION

In the prediction of time series, or also in the modeling of processes with the aid of neural networks, expert knowledge is often ignored. Since, however, in many cases experts can be found for the respective problematic who are in a position to express their knowledge in the form of fuzzy rules, what are called neuro-fuzzy systems are used for predicting time series or for modeling processes, whereby fuzzy systems and neural networks, with their respective characteristic properties, are combined with one another.

A fuzzy system specified by means of rules is thereby standardly translated into a neural network equivalent to the rules, and the neural network is optimized on the basis of training data. The optimized neural network is then again mapped onto fuzzy rules, whereby knowledge concerning the now-optimized system is extractable for an expert. This would not be possible given the exclusive use of neural networks.

Basic principles of neuro-fuzzy systems are known for example from document, R. Kruse et al., Neuronale Fuzzy-Systeme, Spektrum der Wissenschaft, S. 34–41, June 1995.

An overview of various learning methods for neural networks, for example monitored learning methods or unmonitored learning methods, are known from document, J. Hertz et al., Introduction to the Theory of Neural Computation, Lecture Notes Volume I, Addison Wesley Publishing Company, ISBN 0-201-51560-1, 1995.

Methods for removing (pruning) or, respectively, reviving (growing) weights and/or neurons of a neural network are known for example from document, C. Bishop, Neuronal Networks for Pattern Recognition, Clarendon Press, Oxford, ISBN 0-198-538-642, pp.353–364, 1995 and document, A. Gail et al., Rule Extraction: From Neural Architecture to Symbolic Representation, Connection Science, vol. 7, no.1, pp. 3–27, 1995.

In addition, it is known from document, R. Neuneier and H. G. Zimmermann, A Semantic-Preserving Learning Algorithm for Neuro-Fuzzy Systems with Applications to Time Series Prediction, Proceedings of the ICANN Workshop "Banking, Finance and Insurance," Paris, pp. 1–5, 1995, to use semantics-preserving learning algorithms for the training of the neural network of a neuro-fuzzy system, so that the new rules of the fuzzy rule set continue to make correct and useful statements.

In addition, it is also known from document, R. Neuneier and H. G. Zimmermann, A Semantic-Preserving Learning Algorithm for Neuro-Fuzzy Systems with Applications to Time Series Prediction, Proceedings of the ICANN Workshop "Banking, Finance and Insurance," Paris, pp.1–5, 1995, to prune entire rules of the rule set in the optimization of the neural network of a neuro-fuzzy system.

In addition, what is called an early-stopping method is also known from document, W. Finnoff et al., Improving Generalization by Nonconvergent Model Selection Methods, Neural Networks, no. 6, 1992, for the pruning or, respectively, growth of the weights and/or neurons of a neural network.

In the document, H. Hensel et al., Optimierung von Fuzzy-Control mit Hilfe Neuronaler Netze, atp, Automatisierungstechnische Praxis, vol. 37, no. 11, pp. 40–48, 1995, an overview concerning the optimization of fuzzy control with the aid of neural networks is specified.

From, J. Hollatz, Integration von regelbasiertem Wissen in neuronale Netze, Dissertation Institut für Informatik, Technische Universität München, pp. 35–58, 1993, an overview is known concerning the design of rules and the transformation of rules in neural networks.

The pruning of entire rules in a fuzzy rule set has the disadvantage that the granularity of the optimization of the fuzzy rule set is very rough. For this reason, the precision of the fuzzy rule set obtained is relatively low. The results achieved with the optimized fuzzy rule set are also imprecise with this known method.

SUMMARY OF THE INVENTION

The invention is thus based on the problem of indicating a method for optimizing a fuzzy rule set that yields a more powerful, better optimized fuzzy rule set than is possible with the known method.

In general terms the present invention is a method for optimizing a predetermined fuzzy rule set having an arbitrary number of rules using a computer. The fuzzy rule set is mapped onto a neuronal network. A respective neuron of the neural network describes a rule of the fuzzy rule set. A respective weight of a neuron describes a premise of the rule that is described by the corresponding neuron. The neural network is trained. the new neural network is mapped onto a new fuzzy rule set, whereby the new fuzzy rule set is characterized by the new neural network. Individual weights of the neural network are pruned or grown, whereby a new neural network is formed, in which individual premises of the rules of the fuzzy rule set are pruned or, respectively, added.

Advantageous developments of the present invention are as follows.

An error is determined for the new neural network. For the case in which the error lies under a predeterminable limit, the method is terminated and the new fuzzy rule set represents the optimal fuzzy rule set. For the case in which the error lies above the limit, the method is repeated iteratively until the error lies below the limit. The premises of the rules are described with the weights of the neural network. The premises of the rules are coded in binary fashion with the weights of the neural network.

A gradient decrease method is used for the training of the neural network.

A semantics-preserving learning algorithm is used for the training of the neural network.

Rules of the new fuzzy rule set with identical semantics are combined to form a new rule. A reliability value of the new rule results from the sum of the reliability values of the rules that are combined to form the new rule.

Activation functions of neurons of the neural network respectively correspond to a rule.

In this method, carried out using a computer, a fuzzy rule set is mapped onto a neural network. The neural network is trained, and subsequently weights and/or neurons of the trained neural network are pruned and/or grown for the trained neural network. In a last step, a new neural network formed in this way is mapped onto a new fuzzy rule set.

By taking into account individual weights and/or neurons in the pruning or, respectively, growth in the neural network, a higher granularity is achieved in the modification of the individual rules of the fuzzy rule set by means of the pruning or, respectively, growth of elements of the neural network. The granularity is increased in such a way that not only are entire rules pruned from the fuzzy rule set, but rather individual premises of the rules of the fuzzy rule set can be pruned or, respectively, added. By this means, the power and reliability, and thus the achieved results of the neuro-fuzzy system, are increased considerably.

It is advantageous to carry out the method iteratively until an error determined for the respective current neural network lies under a predeterminable threshold. In this way it is possible on the one hand to form an evaluation of the respectively formed neural network and of the new fuzzy rule set determined therefrom, and on the other hand to control the "quality" of the respective new fuzzy rule set in such a way that it achieves a predeterminable quality.

In addition, it is advantageous to construct the structure of the neural network in such a way that the premises of the rules are described with the weights of the neural network. By this means, the pruning or, respectively, the growth of premises of the rules is already enabled by pruning or, respectively, growth of the weights of the neural network. A further simplification in the optimization of the fuzzy rule set is achieved in that the premises of the rules are coded in binary fashion with the weights of the neural network. In this way, a very simple optimization of the rule set is possible that is easily surveyable for the optimization of the fuzzy rule set and is connected with a low computing expense.

In order further to increase the reliability of the optimized fuzzy rule set, it is advantageous to use a semantics-preserving learning algorithm. In this way it is ensured that the semantics of the rules do not change, and thus fewer contradictions arise in the rules.

In addition, for simplification and for the savings connected therewith of computing time in the execution of the method with the aid of a computer, it is advantageous to combine new rules that make the same statement, i.e. comprise the same semantics, into one rule. A reliability value allocated to each rule is formed in this case from the sum of the reliability values of the rules that are combined to form the new rule.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 1 shows a block diagram in which the design of a neuro-fuzzy system is presented;

FIG. 2 shows a flow diagram in which individual method steps of the first embodiment are presented;

DESCRIPTION OF THE PREFERRED EMBODIMENTS

Figure 3:
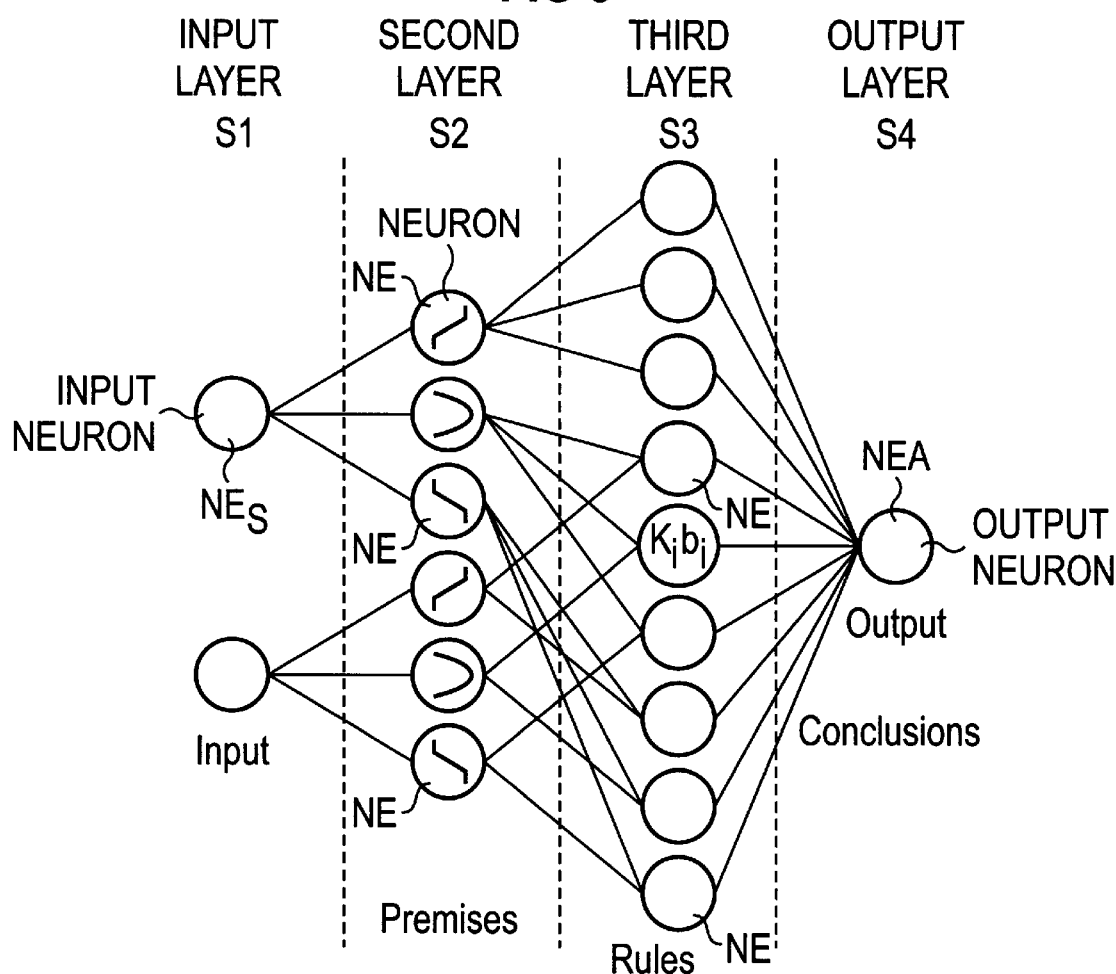
FIG. 3 shows a drawing of a 4-layer neural network whose topology can advantageously be used in the method.

FIG. 1 shows the design of a neuro-fuzzy system in the form of a drawing. A user B inputs rules $R_i$ that respectively describe an application into a computer R. The rules $R_i$ form a fuzzy rule set FR to be optimized. The fuzzy rule set FR is mapped onto a neural network NN that is optimized by arbitrary training methods and possibly additional methods for pruning and/or growth of weights $w_i$ and/or neurons NE of the neural network NN to form a new neural network NNN. The new neural network NNN is mapped onto a new fuzzy rule set NFR. The new fuzzy rule set NFR is interpreted by the user B in a last step. By this means, it is easy for the user B to extract information about the optimized neuro-fuzzy system.

As described above, the user B inputs the rules $R_i$ that form the fuzzy rule set FR into the computer R. The rules $R_i$, whereby i is an arbitrary natural number between 1 and n and unambiguously identifies each rule, and n describes a number of rules $R_i$ inside the fuzzy rule set FR, have for example the following generally formulated form:

Rule $R_i$:
Premise: IF $x_1$=a and $x_2$=b
Conclusion: THEN 1=c WITH BELIEF d.

a and b hereby designate arbitrary values of premise variables $x_1$, $x_2$. This simple example in no way limits an arbitrary number of premises in a rule $R_i$, but rather is only supposed to represent the general structure of a rule in easily surveyable fashion.

The number n of rules $R_i$, as well as the number of premises in the rule $R_i$, are arbitrary. 1 describes a conclusion variable of the respective rules $R_i$. A value c of the conclusion variable 1 respectively describes the initial value of the rule $R_i$, if all premises of the rule $R_i$ hold. In addition, a reliability value $\kappa_i$ is allocated to each rule $R_i$. In the general case described above, the reliability value $\kappa_i$ has the specific value d.

The fuzzy rule set FR is mapped onto the neural network NN. This can for example take place in such a way that each rule $R_i$ corresponds to an activation function $b_i(x)$ of a neuron NE in a hidden layer of the neural network NN. In this case, this means that the number of neurons NE in a hidden layer of the neural network NN corresponds to the number of rules $R_i$ in the fuzzy rule set FR. For a given input value x that in the above example results from a vector with the individual components $x_1$ and $x_2$, an output value y(x) of the neural network NN results for example from a weighted average value of all conclusions of all neurons NE of the hidden layer of the neural network NN. Weighting factors, designated weights $w_i$ in the following, of the neurons NE in the neural network NN are arbitrarily predeterminable, and are optimized in the additional optimization step of the neural network NN. For the output value y(x) of the neural network NN, there results for example the following rule:

$$y(\underline{x}) = \frac{\sum_{i=1}^{n} w_i \cdot b_i(\underline{x})}{\sum_{i=1}^{n} b_i(\underline{x})}. \tag{1}$$

The activation function $b_i(x)$ respectively results for example according to the following rule:

$$b_i(\underline{x}) = \kappa_i \cdot \prod_j MF_{ij}(\underline{x}_j). \tag{2}$$

The linguistic expressions of the rule $R_i$ of the fuzzy rule set FR are standardly realized by one-dimensional membership functions $MF_{ij}(x_j)$. An index j hereby designates the number of input quantities of the neurons, in this context also the number of premises in the respective rule $R_i$. A wide variety of forms of membership functions $MF_{ij}(x_j)$ are known, and can be used in this method without restrictions. For better representability, however, in the following the membership function $MF_{ij}(x_j)$ is assumed to be a Gauss-shaped function, parameterized by centers $\mu_{ij}$ and variances $\sigma_{ij}$.

In addition, for simplification it is assumed that the conclusion is respectively given by a predeterminable constant. For this simple case, presented here as an example, there results for the activation function $b_i(x)$ a typical normalized radial base function, and thus a neural network NN that contains normalized radial base functions as activation functions $b_i(x)$. There results a rule for the formation of the activation function $b_i(x)$ for this special case in the following manner:

$$b_i(\underline{x}) = \kappa_i \cdot \prod_j MF_{ij}(\underline{x}_j) = \kappa_i \cdot e^{-0.5 \left( \sum_j \frac{(x_j - \mu_{ij})}{\sigma_{ij}} \right)^2}. \quad (3)$$

The reliability value $\kappa_i$ is a measure that describes how reliable the respective rule $R_i$ is. The reliability value $\kappa_i$ is standardly a positive number. If the reliability value $\kappa_i$ is equal to 0, this means that the entire rule $R_i$ described by the activation functions $b_i(x)$ was pruned.

In the first embodiment of the method, after the mapping of the rule $R_i$ onto the neural network NN 201 (cf. FIG. 2), a predeterminable number of test values $\Delta_k$ is formed for different topologies k on the basis of the neural network NN 202. The various topologies k are for example formed by omission or addition of individual premises by the neural network NN.

The determination of the test values $\Delta_k$ can for example take place as follows. On the basis of training data that contain an arbitrary number of tuples $(z_1, \ldots, z_m | t_1, \ldots, t_m)$, whereby $z_1, \ldots, z_m$ respectively describe input data of the neural network NN, which lead correspondingly to known result values $t_i, \ldots, t_m$ [sic]. The tuples $(z_i, \ldots, z_m | t_1, \ldots, t_m)$, designated training data $(z_i, \ldots, z_m | t_1, \ldots, t_m)$ in the following, form a set of training data of the neural network NN. m designates the number of training data for a first embodiment. $\Theta$ designates a parameter vector that describes the respective membership function $MF_{ij}(x_j)$. An error $E(z_1, \ldots, z_m, \Theta)$ is determined for the training data using the respective currently valid rules $R_i$ and the membership functions $MF_{ij}(x_j)$.

The determination of the error $E(z_1, \ldots, z_m, \Theta)$ takes place for example according to the following rule:

$$E(z_1, \ldots, z_m, \Theta) = \sum_{p=1}^{m} |z_p - y(z_p)|. \quad (4)$$

A running index p respectively designates a training datum $z_p$ taken into account in the sum with the target datum $t_p$ and with an actual output value $y(z_p)$ of the neural network NN.

In an iterative method, an arbitrary number of test values $\Delta_k$ is determined by respective omission or addition of an arbitrary number of premises or, respectively, rules $R_i$. For the respectively newly arisen topologies of the neural network NN, and thus the newly arisen fuzzy rule sets NFR, a test value $\Delta_k$ is respectively determined as follows:

$$\Delta_k = \left( \sum_{p=1}^{m} |t_p - y_k(z_p)| \right) - E(z_1, \ldots, z_m, \Theta). \quad (5)$$

Upon each modification of the topology k of the neural network NN by modifying the fuzzy rule set FR, there results in general an output value $y_k(x)$ for the respective topology k of the neural network NN:

$$y_k(\underline{x}) = \frac{\sum_{i=1}^{n} w_i \cdot b_{i,k}(\underline{x})}{\sum_{i=1}^{n} b_{i,k}(\underline{x})}. \quad (6)$$

The respective activation functions $b_{i,k}(x)$ for the respective topology k result as:

$$b_{i,k}(\underline{x}) = \kappa_i \cdot \prod_{j \neq k} MF_{ij}(\underline{x}_j). \quad (7)$$

This holds for all topologies $k \in \{MF_{ij}(x_j) | i,j\}$.

The result is a list, stored in the computer, of test values $\Delta_k$ that respectively describe the influence of specific modifications to the fuzzy rule set FR, caused by pruning or, respectively, addition of premises or, respectively, of entire rules, on the overall error $E(z_1, \ldots, z_m, \Theta)$ respectively comprised by the neural network NN in the training data set 203.

A predeterminable number, for example a percentage of weights $W_i$ and/or neurons NE that relatively have the least influence on the modification of the error $E(z_1, \ldots, z_m, \Theta)$ of the neural network NN, are pruned or, respectively, added 204.

In a last step the new neural network NNN, formed in the manner described above, is mapped onto the new fuzzy rule set NFR 205.

In a development of the method, the new neural network NNN, with its new topology, is for example either in turn trained on a further training data set, or the above-described method can be carried out from the outset with the new neural network NNN as the neural network NN of the next iteration.

Presented descriptively, this procedure means that premises that comprise a low information content relating to the error $E(z_1, \ldots, z_m, \Theta)$ of the neural network NN for the training data set are pruned. In contrast, premises with a high information content relating to the error $E(z_1, \ldots, z_m, \Theta)$ of the neural network NN for the training data set remain contained in the structure of the new neural network NNN, as well as in the new optimized fuzzy rule set NFR.

FIG. 3 shows a neural network NN with a 4-layer topology. A second embodiment of the method is explained on the basis of the 4-layer topology.

For an input layer S1 with input neurons $NE_s$, whereby s designates the number of input neurons $NE_s$ and s is an arbitrary natural number, the input variables of the neural network NN are described.

In a second layer S2 of the neural network NN, in this embodiment the membership functions $MF_{ij}(x_j)$ are described directly. This means that for each membership function $MF_{ij}(x_j)$ a neuron NE is provided in the second layer S2. The rules $R_i$ are unambiguously mapped onto a respective neuron NE of a third layer S3. In addition, an output layer S4 is shown that in this simple example comprises only one output neuron NEA.

In the transformation of the rules $R_i$ of the fuzzy rule set FR onto the 4-layer topology of the neural network NN, the following aspects are taken into account:

each rule $R_i$ is unambiguously mapped onto a neuron NE of the third layer S3 of the neural network NN;

each membership function $MF_{ij}(x_j)$ is unambiguously mapped onto a neuron NE in the second layer S2 of the neural network NN, weights $w_i$ of the connections between input neurons $NE_s$ and the neurons NE of the second layer S2 are determined by the parameter $\sigma_{ij}$ of the corresponding membership function $MF_{ij}(x_j)$ for the special case of a Gauss-shaped function membership function $MF_{ij}(x_j)$ by the variance $\sigma_{ij}$. Moreover, the parameter $\mu_{ij}$—given a Gauss-shaped membership function $MF_{ij}(x_j)$, the center $\mu_{ij}$ of the Gauss-shaped membership function $MF_{ij}(x_j)$, which respectively represents a negative bias—is stored, since this value is subtracted from the respectively adjacent input signal;

a connection of a neuron NE of the second layer S2 to a neuron NE of the third layer S3 exists precisely when the membership function $MF_{ij}(x_j)$ is also actually present in the premise of the rule $R_i$; otherwise the value 0 holds for the connection.

Figure 4:
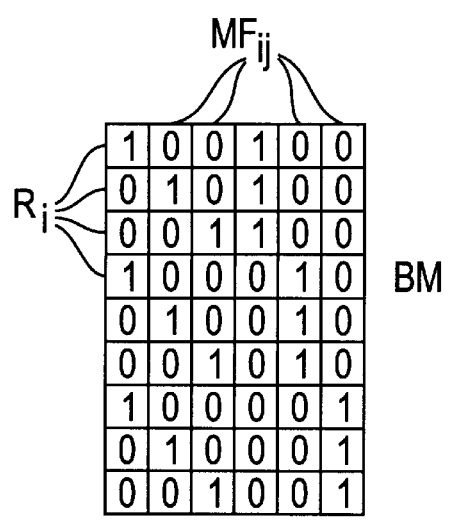
FIG. 4 shows a drawing of a binary premise matrix that corresponds to the neural network of FIG. 3.

As is shown in FIG. 4, this type of transformation has the result that the connections between the neurons NE of the second layer S2 and the neurons NE of the third layer S3 can be represented by a binary matrix BM. In the binary matrix BM, the rules $R_i$ of the fuzzy rule set FR are respectively plotted in a respective line of the binary matrix BM. In the columns, the individual membership functions $MF_{ij}(x_j)$ are entered. In this context, a 1 in the binary matrix BM means that there exists a connection between the respective neuron NE of the second layer S2, which corresponds to a corresponding membership function $MF_{ij}(x_j)$, and the respective neuron NE of the third layer S3, which describes a premise of the respective rule $R_i$.

Descriptively, this means that the value 1 in the binary matrix BM indicates that the respective premise is taken into account in the rule $R_i$, and the value 0 means that the respective premise is not taken into account in the rule $R_i$.

By means of the 4-layer topology shown here of the neural network NN, it is possible to carry out the method in a very simple way, whereby the required computing time for the execution of the method by a computer is further reduced. In addition, the methods used in this context for the pruning or, respectively, growth of weights $w_i$ and/or neurons NE can be freely chosen.

Figure 5:
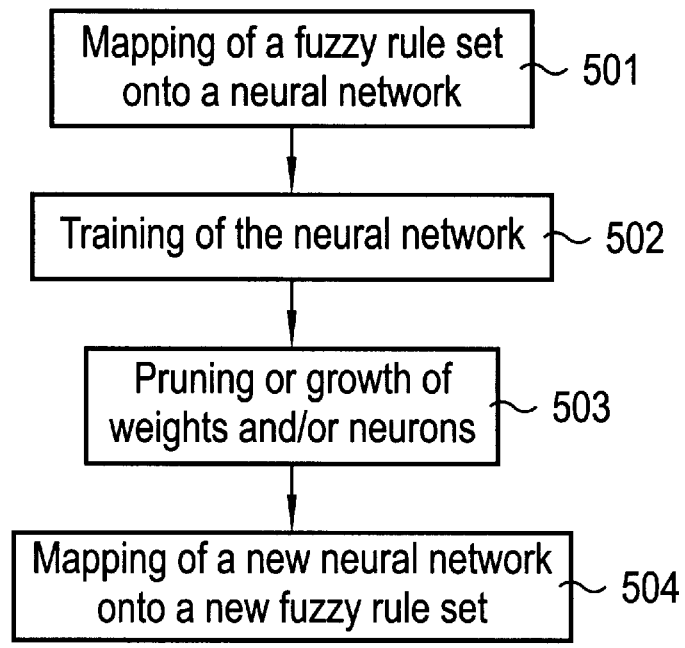
FIG. 5 shows a flow diagram in which the individual steps of the method are presented.

In FIG. 5, the method with its method steps is shown in the form of a flow diagram.

The fuzzy rule set FR is mapped onto the neural network NN 501.

The neural network NN is trained with an arbitrary learning method, e.g. with a gradient descent method (e.g. the back-propagation method) 502. An overview of various learning methods of a neural network is found in document, J. Hertz et al., Introduction to the Theory of Neural Computation, Lecture Notes Volume I, Addison Wesley Publishing Company, ISBN 0-201-51560-1, 1995.

In a further step 503, weights $w_i$ and/or neurons NE of the trained neural network NN are pruned or grown for the now-trained neural network NN. Arbitrary methods can hereby be used for the pruning or, respectively, growth. An overview of such methods is presented in document, C. Bishop, Neuronal Networks for Pattern Recognition, Clarendon Press, Oxford, ISBN 0-198-538-642, pp. 353–364, 1995. In addition, what is called an early-stopping method can also be used for the pruning or, respectively, growth of the weights $w_i$ and/or neurons NE of the neural network NN. This method is described in document W. Finnoff et al., Improving Generalization by Nonconvergent Model Selection Methods, Neural Networks, no. 6, 1992.

By pruning or, respectively, growth of weights $w_i$ and/or neurons NE of the neural network NN, a new neural network NNN is formed.

The new neural network NNN is mapped onto the new fuzzy rule set NFR. The new fuzzy rule set NFR is thereby characterized by the new neural network NNN 504.

In a development of the method, it is advantageous for example to determine the error $E(z_1, \ldots, z_m, \Theta)$ according to the rule (4) described above and to check whether the error $E(z_1, \ldots, z_m, \Theta)$ is smaller than a predeterminable limit with which a desired quality of the optimized fuzzy rule set NFR is indicated.

If this is the case, in this development it can be assumed that the quality of the optimized neural network, i.e. corresponding to the new neural network NNN to the handicap by means of the limit, is sufficient. However, if the error $E(z_1, \ldots, z_m, \Theta)$ is greater than the predeterminable limit, the new neural network NNN must be further optimized, which is achieved by means of an iterative execution of the method described above. In the binary matrix BM shown in FIG. 4, a simple example is assumed in which two input variables $x_1$ and $x_2$ are assumed, each with three possible values. However, this in no way limits the general applicability of this procedural principle. Both the number of the input values for the neural network NN and also the number of values that the input variables $x_1$ and $x_2$ can assume is arbitrary.

In a development of the method, it is provided to use what is called a semantics-preserving learning algorithm for the optimization of the neural network NN. The semantics-preserving learning algorithm is for example described in document, R. Neuneier and H. G. Zimmermann, A Semantic-Preserving Learning Algorithm for Neuro-Fuzzy Systems with Applications to Time Series Prediction, Proceedings of the ICANN Workshop "Banking, Finance and Insurance," Paris, pp. 1–5, 1995. Since by means of modification of the rules $R_i$ by pruning or, respectively, growth of weights $w_i$ and/or neurons NE, new rules $R_i$ with the same premises and the same conclusions can arise, in a development of the method it is advantageous to combine "identical" new rules $R_i$ to form one rule $R_j$, and to form the reliability value $\kappa_j$ of the respective rule $R_j$, which results from the combination of several identical rules $R_i$, from the sum of the reliability values $\kappa_i$ of the combined rules $R_i$.

Figure 6:
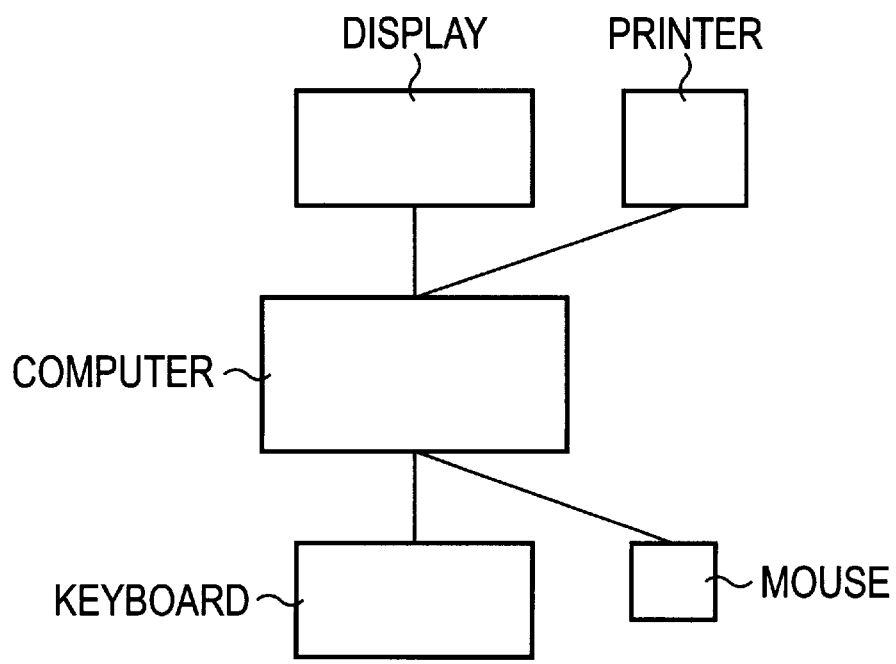
FIG. 6 shows a drawing of a computer with which the method is executed.

FIG. 6 shows the computer R, with which the method is executed, in the form of a drawing. The computer R additionally comprises for example a keyboard TA, a mouse MA as an input means for inputting the fuzzy rule set FR by the user, as well as for example a printer DR or a display screen BS for the display of the new fuzzy rule set NFR for the user B. The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for optimizing a predetermined fuzzy rule set having an arbitrary number of rules using a computer, comprising the steps of:

mapping the fuzzy rule set onto a neural network, a respective neuron of the neural network describing a rule of the fuzzy rule set, and a respective weight of a corresponding neuron describing a premise of the rule that is described by the corresponding neuron;

training the neural network;

mapping a new neural network onto a new fuzzy rule set, the new fuzzy rule set being characterized by the new neural network;

altering individual weights of the neural network to form the new neural network, in which individual premises of the rules of the fuzzy rule set are one of pruned and added.

2. The method according to claim 1, wherein an error is determined for the new neural network, wherein if, the error lies under a predeterminable limit, the method is terminated and the new fuzzy rule set represents an optimal fuzzy rule set, and wherein if, the error lies above the predetermined limit, the method is repeated iteratively until the error lies below the limit.

3. The method according to claim 1, wherein the premises of the rules are described with the weights of the neural network.

4. The method according to claim 1, wherein the premises of the rules are coded in binary fashion with the weights of the neural network.

5. The method according to claim 1, wherein a gradient decrease method is used for training of the neural network.

6. The method according to claim 1, wherein a semantics-preserving learning algorithm is used for training of the neural network.

7. The method according to claim 1, wherein rules of the new fuzzy rule set with identical semantics are combined to form a new rule, whereby a reliability value of the new rule results from a sum of the reliability values of the rules that are combined to form the new rule.

8. The method according to claim 1, wherein activation functions of neurons of the neural network respectively correspond to a rule.

* * * * *